No. 779,422. Patented January 10, 1905.

UNITED STATES PATENT OFFICE.

FLETCHER B. HOLMES, OF WOODBURY, NEW JERSEY, ASSIGNOR TO THE EASTERN DYNAMITE COMPANY, OF WILMINGTON, DELAWARE, A CORPORATION OF NEW JERSEY.

PROCESS OF MAKING NITRATED STARCH.

SPECIFICATION forming part of Letters Patent No. 779,422, dated January 10, 1905.

Application filed July 21, 1904. Serial No. 217,502.

*To all whom it may concern:*

Be it known that I, FLETCHER B. HOLMES, a citizen of the United States, residing at Woodbury, county of Gloucester, and State of New Jersey, have invented a new and useful Improvement in Processes of Manufacturing a Stable Nitrated Starch, of which the following is a full, clear, and exact description, reference being had to the accompanying drawings, which form a part of this specification.

The object of my process is to produce a stable nitrated starch.

The process which I have discovered for the production of this stable nitrated starch is as follows: The starch is mixed with an admixture of concentrated sulfuric and nitric acids, preferably in the proportions of twenty-five parts of starch to one hundred parts of mixed sulfuric and nitric acid in the following proportions, nitric acid 32.5 per cent., sulfuric acid 64.5 per cent., water three per cent., although I do not intend to limit myself to this particular proportion of the acids or starch. In fact, this particular proportion of acids is another discovery of mine, for which I have filed an application contemporaneous with the application for this invention.

After the starch has been nitrated it is separated from the acids. After separation from the acids the nitrated starch, which is then in an unstable condition, due to impurities, is mixed with alcohol and a reagent which has a lower evaporating-point than the alcohol, and which reagent alone or in the presence of alcohol will dissolve the nitrated starch.

As the reagent above mentioned I have used acetone or ether, both of which have a lower evaporating-point than the alcohol. The acetone alone will dissolve the nitrated starch. The ether alone will not dissolve all the nitrated starch, but in conjunction with the alcohol will dissolve substantially all of the nitrated starch. Both acetone and ether have a lower evaporating-point than alcohol. I prefer to use acetone, as I obtain a higher nitrated product than where ether is used, as when acetone is used the lower nitrates remain in the solution, while when ether is used some of the lower nitrates are subsequently precipitated.

I have used approximately one part, by weight, of nitrated starch to one part of acetone or ether and two parts of alcohol.

After the nitrated starch has been dissolved, as above described, either the acetone or ether, whichever may be used, is evaporated off, leaving the nitrated starch in suspension in the alcohol. Whether the ether or acetone be used at this point all the impurities which go to make the nitrated starch unstable will be in solution in the alcohol. The nitrated starch freed from its impurities is then separated from the alcohol either by filtration or decantation and then washed with alcohol and dried.

Where I use the term "acetone" in the claims, I intend to include also ether as a substitute for acetone.

Having now fully described my invention, what I claim, and desire to protect by Letters Patent, is—

1. The hereinbefore-described process for producing a stable nitrated starch, which consists in nitrating the starch, then dissolving the nitrated starch in a mixture of alcohol and a solvent which has a lower evaporating-point than alcohol, then evaporating the latter solvent and separating the nitrated starch from the alcohol.

2. The hereinbefore-described process of producing a stable nitrated starch, which consists in nitrating the starch, then dissolving the nitrated starch in an admixture of alcohol and acetone, then evaporating off the acetone and separating the nitrated starch from the alcohol.

In testimony of which invention I have hereunto set my hand at Philadelphia on this 20th day of July, 1904.

FLETCHER B. HOLMES.

Witnesses:
M. M. HAMILTON,
WILLIAM B. MARKS.